(12) United States Patent
Azruel et al.

(10) Patent No.: US 12,436,681 B2
(45) Date of Patent: Oct. 7, 2025

(54) PROCESSING WRITE OPERATION INFORMATION USING INFLATED DATA

(71) Applicant: Dell Products L.P., Round Rock, TX (US)

(72) Inventors: Amihay Azruel, Raanana (IL); Amitai Alkalay, Kadima (IL); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/598,336

(22) Filed: Mar. 7, 2024

(65) Prior Publication Data

US 2025/0284397 A1  Sep. 11, 2025

(51) Int. Cl.
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ..... G06F 3/0611; G06F 3/0659; G06F 3/0679
See application file for complete search history.

(56) References Cited

U.S. PATENT DOCUMENTS

| | | | |
|---|---|---|---|
| 8,880,788 B1 | 11/2014 | Sundaram et al. | |
| 9,223,642 B2 | 12/2015 | Yu et al. | |
| 2013/0111133 A1* | 5/2013 | Benhase | G06F 12/0888 |
| | | | 711/E12.024 |
| 2017/0123733 A1 | 5/2017 | Cohen | |
| 2017/0235636 A1* | 8/2017 | Zhou | G06F 3/0619 |
| | | | 714/764 |
| 2018/0059931 A1* | 3/2018 | Rueger | G06F 12/0868 |
| 2019/0278498 A1* | 9/2019 | Dedrick | G06F 3/0653 |
| 2024/0087077 A1 | 3/2024 | Ray et al. | |

\* cited by examiner

*Primary Examiner* — Larry T MacKall
(74) *Attorney, Agent, or Firm* — BainwoodHuang

(57) ABSTRACT

A technique that processes write operation information involves receiving, as the write operation information, user data and corresponding metadata. The technique further involves generating inflated data which includes the user data and the corresponding metadata. The inflated data has a size that is larger than a total (or overall) size of the user data and the corresponding metadata. Additionally, the inflated data naturally aligns on storage boundaries of solid state device (SSD) storage (non-volatile flash memory). The technique further involves, after generating the inflated data, storing the inflated data in the SSD storage.

20 Claims, 6 Drawing Sheets

PROCESSING WRITE OPERATION INFORMATION USING INFLATED DATA

BACKGROUND

A conventional data storage system includes an input buffer which temporarily holds write data en route to secondary storage. The input buffer is formed of high performance and high endurance memory such as SRAM (static random access memory) which behaves as non-volatile memory by using a battery to maintain a constant charge. The secondary storage is formed of slower, less expensive memory such as solid state device (SSD) memory (non-volatile flash memory), hard disk drive (HDD) memory (magnetic disk drive memory), combinations thereof, etc.

During operation, the conventional data storage system may acknowledge completion of write IOs (write input/output operations) as soon as the write data is stored in the input buffer. Such write-back operation provides faster response times (i.e., lower latency) than write-thru operation in which acknowledgement is provided only after the write data is bound (or committed) to the secondary storage.

SUMMARY

Unfortunately, there are deficiencies to conventional data storage systems which use high performance and high endurance memory such as SRAM as an input buffer. Along these lines, SRAM requires additional resources such as a battery to provide backup power to prevent data loss in the event of a power outage. Additionally, such memory, as well as high end NVRAM, is relatively scarce thus imposing restrictions/limitations on input buffer size as well as increasing the overall cost of the data storage systems. Furthermore, such memory tends to see frequent technology changes and thus has limited lifetime (e.g., shortened life cycles to stay with the best technology and maintain minimum possible latency), typically imposes different support and/or maintenance requirements based on the specific memory type/vendor/etc., and so on.

Improved techniques are directed to processing write operation information using inflated data which naturally aligns on storage boundaries of SSD storage (e.g., regular NAND flash memory). Such techniques enable writing user data and corresponding metadata as full writes which are aligned with the native page size of the SSD storage. Accordingly, such operation alleviates the need to perform read-modify-writes that would otherwise increase latency (e.g., there is no need to read data from the SSD storage, modify the read data to fit in new data with smaller granularity, and then write the modified data back to the SSD storage). Moreover, such operation enables the use of SSD storage as a write cache (or similar logfile or journal) thus lowering costs, removing the need for additional resources such as a battery to persist data, and alleviating the need to deal with frequent technology changes in higher performance and higher endurance memory.

One embodiment is directed to a method of processing write operation information. The method includes receiving, as the write operation information, user data and corresponding metadata. The method further includes generating inflated data which includes the user data and the corresponding metadata. The inflated data has a size that is larger than a total size of the user data and the corresponding metadata. Additionally, the inflated data naturally aligns on storage boundaries of SSD storage. The method further includes, after generating the inflated data, storing the inflated data in the SSD storage.

Another embodiment is directed to storage equipment which includes SSD storage, and control circuitry coupled with the SSD storage. The control circuitry is constructed and arranged to perform a method of:
(A) receiving, as write operation information, user data and corresponding metadata,
(B) generating inflated data which includes the user data and the corresponding metadata, the inflated data having a size that is larger than a total size of the user data and the corresponding metadata, and the inflated data naturally aligning on storage boundaries of the SSD storage, and
(C) after generating the inflated data, storing the inflated data in the SSD storage.

Yet another embodiment is directed to a computer program product having a non-transitory computer readable medium which stores a set of instructions to process write operation information. The set of instructions, when carried out by computerized circuitry, causes the computerized circuitry to perform a method of:
(A) receiving, as the write operation information, user data and corresponding metadata;
(B) generating inflated data which includes the user data and the corresponding metadata, the inflated data having a size that is larger than a total size of the user data and the corresponding metadata, and the inflated data naturally aligning on storage boundaries of SSD storage; and
(C) after generating the inflated data, storing the inflated data in the SSD storage.

In some arrangements, the SSD storage forms a write cache of a storage array. Additionally, storing the inflated data in the SSD storage includes writing the inflated data into the write cache of the storage array.

In some arrangements, the user data is application data. Additionally, the corresponding metadata is constructed and arranged to identify write operation details for storing the application data in non-volatile memory of the storage array, the non-volatile memory being different from the write cache. Furthermore, the corresponding metadata has a size which is smaller than that of the application data. Also, generating the inflated data includes padding the corresponding metadata to form padded metadata having an inflated size that is larger than the size of the corresponding metadata.

In some arrangements, writing the inflated data into the write cache includes writing, as the inflated data, the application data and the padded metadata into the write cache to enable late binding of the application data into the non-volatile memory.

In some arrangements, the method further includes, after the application data and the padded metadata are written into the write cache, performing a late bind operation which commits the application data to the non-volatile memory of the storage array.

In some arrangements, the method further includes, prior to receiving the user data and the corresponding metadata, performing a comparison operation which compares a size of the user data to a threshold and provides a comparison result indicating that the size of the user data is greater than the threshold.

In some arrangements, padding the corresponding metadata includes, in response to the comparison result indicating that the size of the user data is greater than the threshold, creating a full page which includes the corresponding metadata and zeroes, the full page being aligned with a native page size of the SSD storage.

In some arrangements, the method further includes:
(i) receiving additional user data and corresponding additional metadata;
(ii) performing an additional comparison operation which compares a size of the additional user data to the threshold and provides an additional comparison result indicating that the size of the additional user data is less than the threshold; and
(iii) in response to the additional comparison result indicating that the size of the user data is less than the threshold, refraining from generating additional inflated data which includes the additional user data and the corresponding additional metadata.

In some arrangements, the method further includes, prior to receiving the user data and the corresponding metadata, forming the write cache from a set of SSDs.

In some arrangements, the set of SSDs provides X amount of storage, X amount being at least 1 Terabyte. Additionally, forming the write cache from the set of SSDs includes:
(i) allocating 10% of the X amount of storage to the write cache, and
(ii) allocating at least 80% of the X amount of storage to a garbage collection service to minimize write amplification resulting from garbage collecting the write cache.

It should be understood that, in the cloud context, at least some electronic circuitry is formed by remote computer resources distributed over a network (e.g., hosts, management equipment, scalable storage resources, etc.). Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic assemblies, components and circuitry which are involved in processing write operation information using inflated data.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to processing write operation information using inflated data which naturally aligns on storage boundaries of solid state device (SSD) storage (e.g., routine NAND flash memory or similar commodity hardware). Such a technique enables writing user data and corresponding metadata as full writes which are aligned with the native page size of the SSD storage. Accordingly, such operation alleviates the need to perform read-modify-writes that would otherwise increase latency (e.g., there is no need to read data from the SSD storage, modify the read data to fit in new data with smaller granularity, and write the modified data back to the SSD storage). Moreover, such operation enables the use of regular SSD storage as a write cache, logfile, journal, etc, thus lowering costs, removing the need for additional resources such as batteries to persist data, and alleviating the need to deal with frequent technology changes in higher performance and higher endurance memory.

Figure 1:
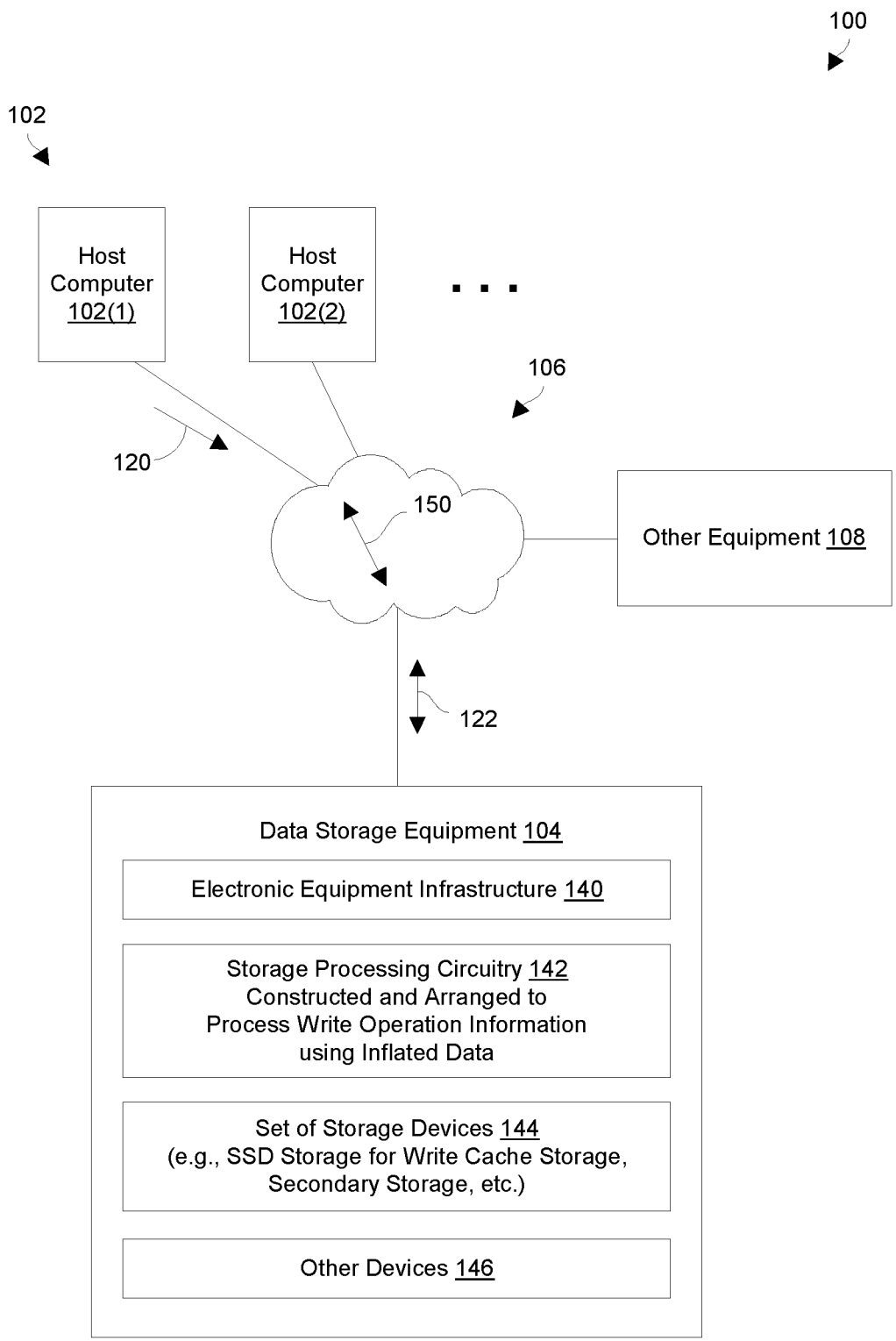
FIG. 1 is a block diagram of an electronic setting which processes write operation information using inflated data in accordance with certain embodiments in accordance with certain embodiments.

FIG. 1 shows an electronic setting 100 in which storage equipment processes write operation information using inflated data in accordance with certain embodiments. By way of example, the electronic setting 100 is a data storage environment that includes host computers 102(1), 102(2), . . . (collectively, host computers 102), data storage equipment 104, a communications medium 106, and perhaps other equipment 108.

It should be appreciated that a variety of electronic situations are suitable for use. Along these lines, such situations may take the form of general purpose computing environments, server farms, cloud-based systems, enterprise/corporate computing/infrastructure equipment, retail settings, manufacturing settings, government settings, specialized service providers, academic settings, websites, environments for specialized operations, combinations thereof, and so on.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to store host data 122 within and retrieve host data 122 from storage (e.g., primary storage or main memory, secondary storage, tiered storage, combinations thereof, etc.).

The data storage equipment 104 is an example of electronic equipment that is capable of processing write operation information using inflated data. The data storage equipment 104 includes an electronic equipment infrastructure 140, storage processing circuitry 142, a set of storage devices 144, and other devices 146.

The electronic equipment infrastructure 140 is constructed and arranged to support operation of various components of the data storage equipment 104. To this end, the electronic equipment infrastructure 140 positions the various components relative to each other, conveys power signals from power converters to the various components, positions fans along air pathways to provide cooling to the various components (i.e., to remove heat), protects the various components against tampering, damage, and so on. Along these lines, the electronic equipment infrastructure 140 may include one or more frames or card cages, chassis/ housings/cabinets, power supplies/converters, fans, backplanes or midplanes, and so on.

The storage processing circuitry 142 is constructed and arranged to respond to the host I/O requests 120 received from the host computers 102 by writing data into the set of storage devices 144 and reading the data from the set of storage devices 144. The storage processing circuitry 142 may include one or more physical storage processing modules or engines, data movers, director boards, blades, etc. In accordance with certain embodiments, the storage processing circuitry 142 may include a variety of specialized subcomponents such as processing circuitry to process I/O requests 120 from the host computers 102, cache memory to operate as read and/or write caches, on-board NICs to provide communications between the storage processing circuitry 142 and/or external devices, LEDs, switches for local I/O, and so on.

The set of storage devices 144 is constructed and arranged to store data within the data storage equipment 104. In accordance with certain embodiments, the set of storage devices 44 may arrange the data in accordance with one or more data protection schemes (e.g., RAID1, RAID5, RAID6, RAID10, etc.). Example storage devices 144 include RAM devices, NVRAM devices, other solid state memory devices (SSDs), hard disk drives (HDDs), combinations thereof, and so on.

The other devices 146 of the data storage equipment 104 are constructed and arranged to provide supporting features. Along these lines, the other devices 146 may include a set of communications interfaces (e.g., a set of network interface controllers or NICs) that provide communications for the data storage equipment 104, a user interface for local user access, backup power sources, and so on.

The communications medium 106 is constructed and arranged to connect the various components of the electronic setting 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 108 is capable of supporting LAN-based communications, SAN-based communications, cellular communications, WAN-based communications, distributed infrastructure communications, other topologies, combinations thereof, etc.

The other equipment 108 represents other possible componentry of the electronic setting 100. Along these lines, the other equipment 108 may include remote data storage equipment that provides data to and/or receives data from the data storage equipment 104 (e.g., replication arrays, backup and/or archiving equipment, external service processors and/or other management/control devices, etc.).

During operation, the data storage equipment 104 processes I/O requests 120 from the set of host computers 102 to perform useful work. In particular, the storage processing circuitry 142 writes host data 122 into and retrieves host data 122 from the set of storage devices 144 in response to the I/O requests 120.

During such operation, the storage processing circuitry 142 is capable of processing write operation information using inflated data which naturally aligns on storage boundaries of SSD storage. In some arrangements, the storage processing circuitry 142 inflates the data when the data is smaller than a predefined size threshold and does not inflate the data when the data is larger than the predefined size threshold in order to prevent excessively consuming bandwidth (e.g., bandwidth saturation).

Such data inflation alleviates the need to perform read-modify-writes when writing data to the SSD storage that would otherwise increase latency (e.g., there is no need to read data from the SSD storage, modify the read data to fit in the new data with smaller granularity, and then write the modified data to the SSD storage). Moreover, such data inflation enables the use of SSD storage as a write cache thus lowering costs, removing the need for additional resources such as a battery to persist data, and alleviating the need to deal with frequent technology changes, trends, etc. in higher performance and higher endurance memory. Further details will now be provided with reference to FIG. 2.

Figure 2:
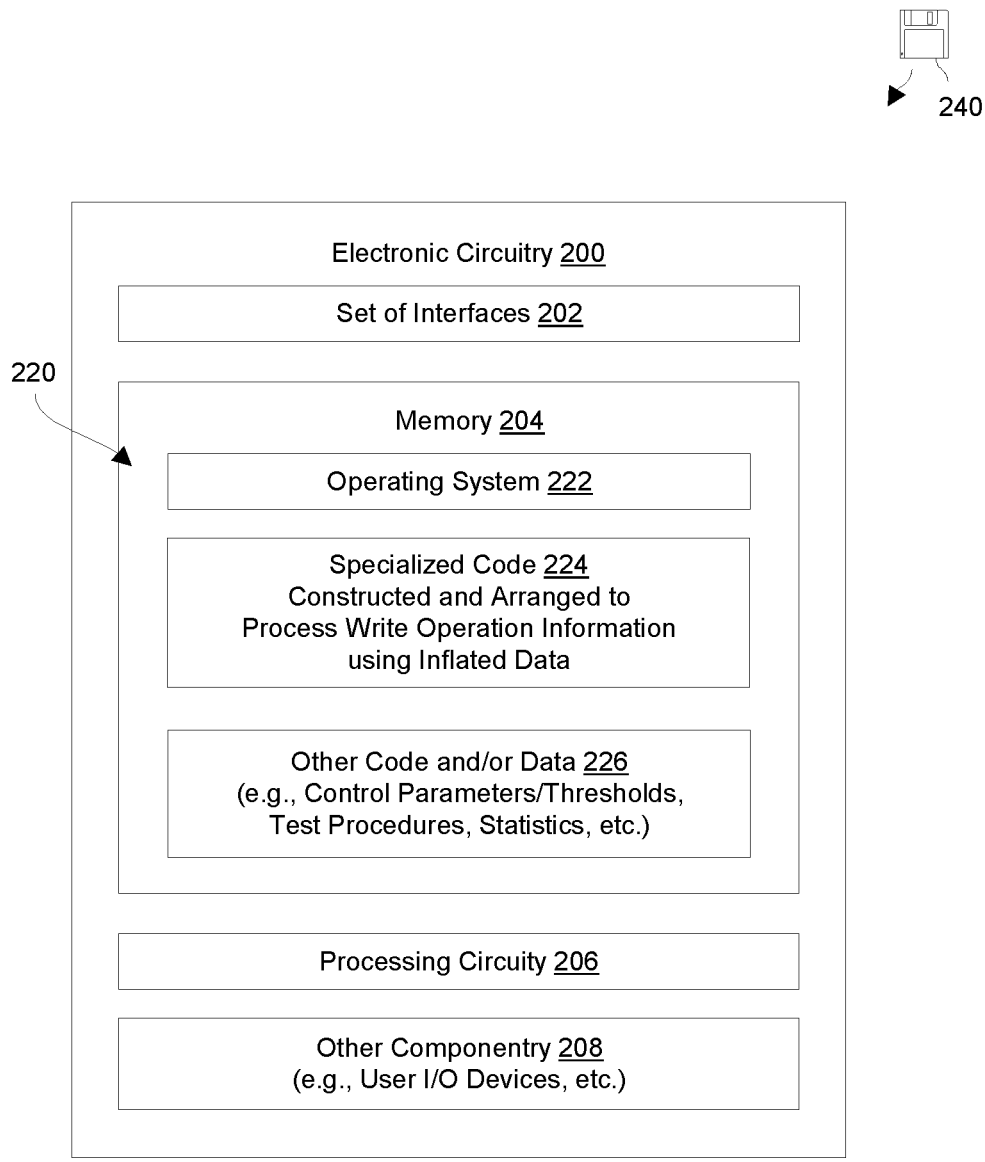
FIG. 2 is a block diagram of electronic circuitry (or equipment) suitable for the electronic setting in accordance with certain embodiments.

FIG. 2 shows electronic circuitry 200 which is suitable for at least a portion of the data storage equipment 104 of the electronic setting 100 in accordance with certain embodiments (also see the storage processing circuitry 142 in FIG. 1). The electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 106 (FIG. 1) to enable communications with other devices of the electronic setting 100. Such communications may be IP-based, SAN-based, cellular-based, cable-based, fiber-optic based, wireless, cloud-based, combinations thereof, and so on. Additionally, the set of interfaces 202 is constructed and arranged to connect the electronic circuitry 200 to other local equipment. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions for processing write operation information using inflated data which naturally aligns on storage boundaries of SSD storage. The other code and data 226 refers to control parameters/thresholds, tools, routines, test procedures, statistics, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably enables the electronic circuitry 200 to process write operation information using inflated data which naturally aligns on storage boundaries of SSD storage. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a local user I/O circuitry, circuitry for fault tolerance, etc. Further details will now be provided with reference to FIG. 3.

Figure 3:
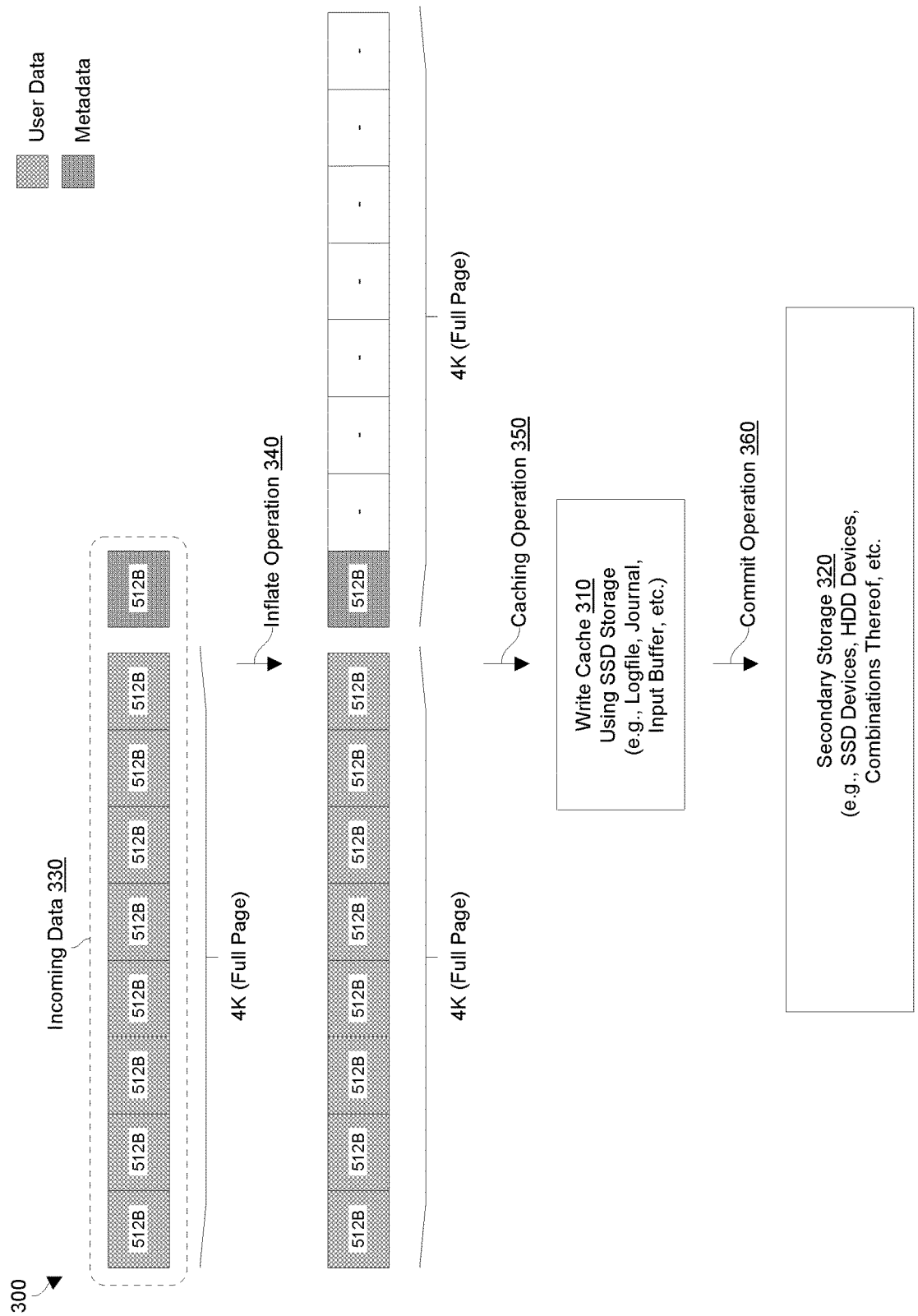
FIG. 3 is a block diagram of example incoming data processing in accordance with embodiments.

FIG. 3 shows a view 300 illustrating how the electronic circuitry 200 (FIG. 2) may process example data using inflated data in accordance with certain embodiments. The view 300 includes a write cache 310 and secondary storage 320 (also see the data storage equipment 104 in FIG. 1 and the electronic circuitry 200 in FIG. 2).

The write cache 310 serves as temporary storage for write operation information for a write request. Such a write request may originate from a variety of sources such as a host (e.g., see the host request 120 from one of the host computers 102 in FIG. 1), a peer storage processor, another node of a cluster, and so on. Moreover, the write cache 310 may be constructed and arranged to store the write operation information in the form a logfile, a journal, pages of virtual memory, combinations thereof, and so on.

Use of such a write cache 310 enables the write request to be acknowledged as soon as the write operation information is safely stored in the write cache 310. Such write-back processing reduces latency since the source of the write request may receive acknowledgement prior to data contained within the write request actually being committed to (via late binding) the secondary storage 320.

In accordance with certain embodiments, the write cache 310 is formed of SSD storage or similar commodity hardware. In the context of non-volatile flash memory, the write cache 310 does not require complex/costly batteries to maintain data and/or frequent upgrading/modernization to avoid becoming obsolete.

The secondary storage 320 may be formed by various non-volatile forms of memory such as SSDs, hard disk drives (HDDs), combinations thereof, etc. In some arrangements, the secondary storage 320 may be configured into tiers (i.e., tiered storage).

By way of example, suppose that the SSD storage that forms the write cache 310 has a native page size of 4K. In such arrangements, the electronic circuitry 200 is able to write data at full page granularity at relatively fast speed (e.g., 900K IOPS). However, the electronic circuitry 200 may nevertheless be able to write data at smaller granularity to the write cache 310 such as in sizes of 512 B by performing read-modify-write operations at a slower speed (e.g., at less than 200K IOPS).

At this point, it should be appreciated that minimizing latency may be achieved by writing data into the write cache 310 at the native page size (e.g., as full 4K pages). In particular, data which is less than a full page may be inflated (e.g., padded with zeroes) to align that data with the native page size of the write cache 310. In this example, all 512 B sectors may be inflated to 4 KB. Such operation alleviates the need to perform suboptimal read-modify-write operations.

Along these lines and as shown in FIG. 3, suppose that incoming data 330 includes 4K of user data (identified with thin cross hatching) and 512 B of corresponding metadata (identified with darker cross hatching). For example, the 4K of user data may be provided by a user level application (e.g., a client application running on a host). Additionally, the 512 B of corresponding metadata may include particular information for the write operation (e.g., a page descriptor, etc.).

Now, if the electronic circuitry 200 were to simply write the incoming data 330 to the write cache 310 as is, the electronic circuitry 200 would be able to write the 4K of user data to the write cache 310 as a full page at a relatively fast speed. However, the electronic circuitry 200 would have to write the 512 B of corresponding metadata to the write cache 310 via a read-modify-write operation which could significantly increase the processing time (e.g., increase latency by 75%).

To avoid performing the read-modify-write operation, the electronic circuitry 200 inflates one or more portions of the incoming data 330. In this example, the electronic circuitry 200 does not inflate the user data since the user data is already aligned with native page boundaries of the SSD storage which forms the write cache 310. However, the electronic circuitry 200 inflates the corresponding metadata since the corresponding metadata is not currently aligned with native page boundaries of the SSD storage which forms the write cache 310.

That is, the electronic circuitry 200 performs an inflate operation 340 which inflates the incoming data 330 to align with the native memory boundaries of the write cache 310. Specifically, to inflate initial data of the size of 512 B, the electronic circuitry 200 pads the initial data with zeroes to form inflated data in accordance with certain embodiments. Accordingly, the electronic circuitry 200 creates, from initial metadata which is 512 B in size, inflated metadata which is 4K in size (e.g., by adding 3,584 B of zeroes) as shown in FIG. 3. As a result, the inflated metadata is aligned with native page boundaries of the SSD storage which forms the write cache 310.

As further shown in FIG. 3, the electronic circuitry 200 performs a caching operation 350 which stores the inflated incoming data which includes 4K of user data and now 4K of corresponding metadata (i.e., the inflated metadata) in the write cache 310. Since the caching operation 350 involves writing only full pages, the caching operation 350 is performed very quickly (e.g., at 900K IOPS). Accordingly, for a write-back caching scheme, the electronic circuitry 200 is able to acknowledge the write request with very low latency.

Eventually, the electronic circuitry 200 performs a commit (or late binding) operation 360 which commits the user data to the secondary storage 320. Along these lines, the electronic circuitry 200 identifies where the user data should be stored (e.g., based on the inflated metadata) and then formally synchronizes the user data in the write cache 310 with that in the secondary storage 320.

It should be appreciated that the commit operation 320 may be performed well after the incoming data 330 has been safely stored in the write cache 310. Accordingly, such late binding does not impact perceived performance from the host's perspective.

It should further be appreciated that the native page size for the write cache 310 was described above as being 4 KB by way of example only. In other arrangements, the native page size is different, e.g., 2 KB, 8 KB, 16 KB, 32 KB, 64 KB, 128 KB, and so on. Further details will now be provided with reference to FIGS. 4 and 5.

Figure 4:
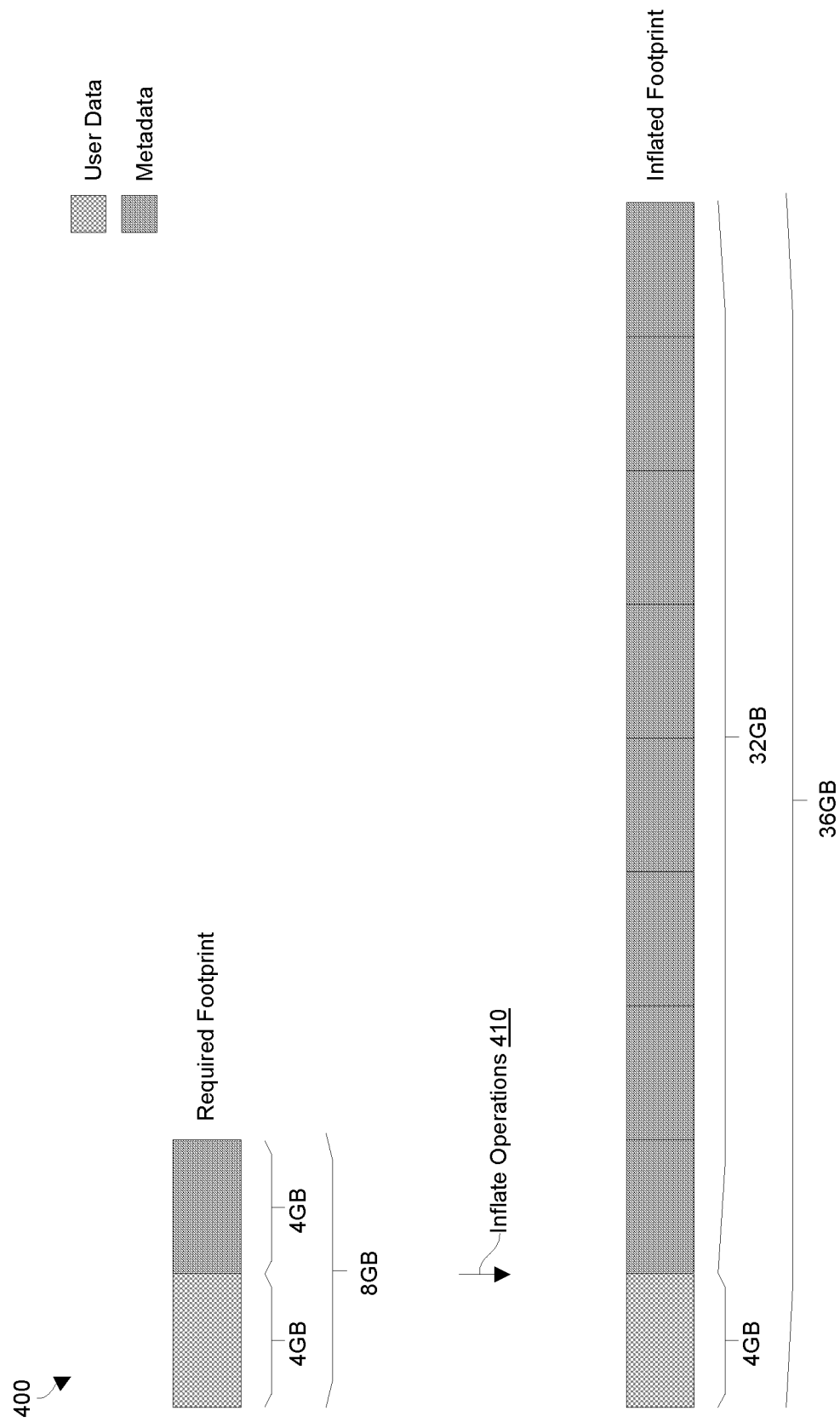
FIG. 4 is a block diagram of other example incoming data processing in accordance with embodiments.
Figure 5:
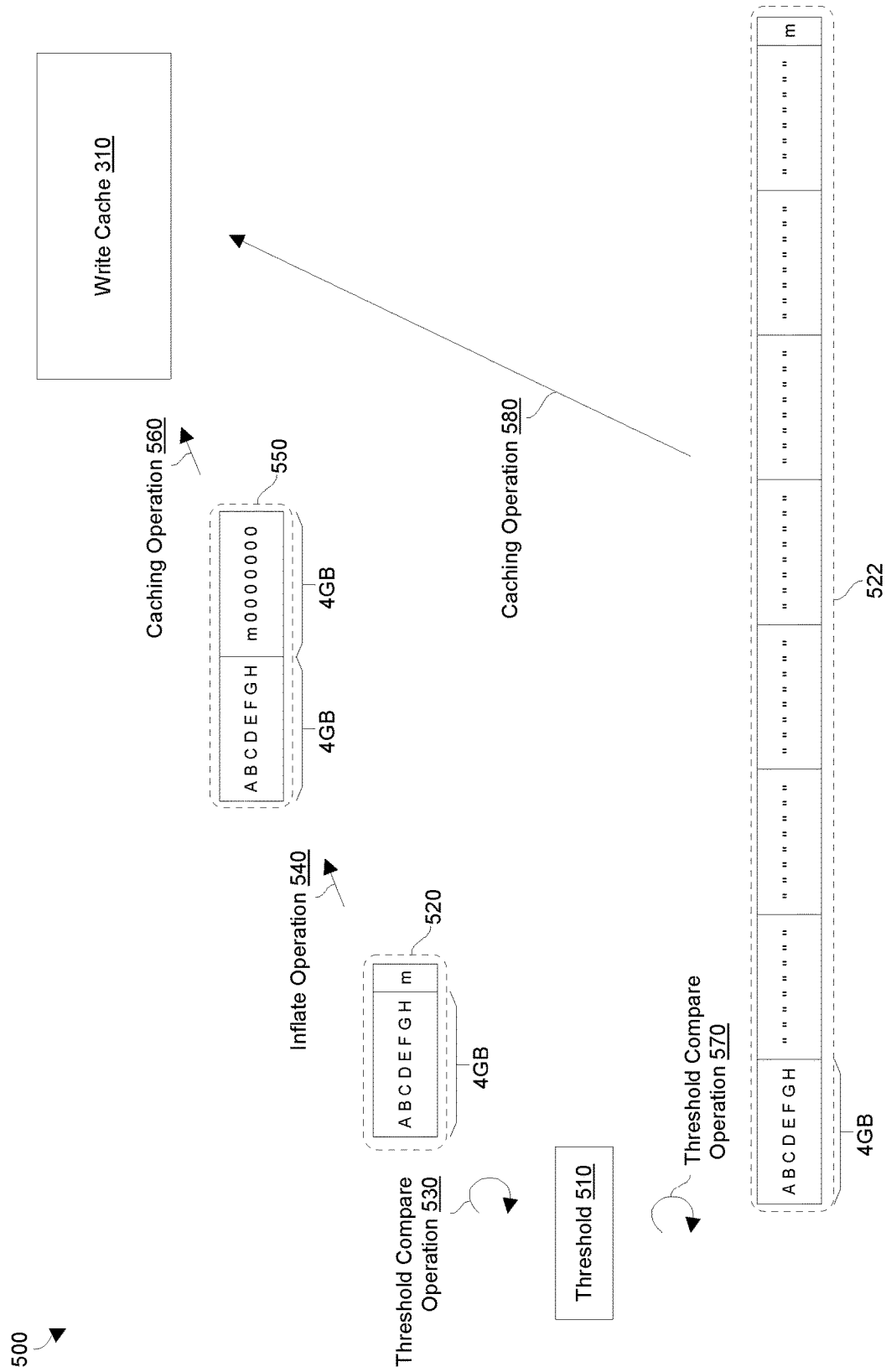
FIG. 5 is a block diagram of additional example incoming data processing in accordance with embodiments.

FIGS. 4 and 5 show additional processing examples in accordance with certain embodiments. FIG. 4 shows an example of initial data which is has a relatively small footprint and which is inflated in accordance with certain embodiments. FIG. 5 shows an example of inflated data which is evaluated for possible inflating but is not inflated to reduce SSD endurance overhead (e.g., to maximize endurance) in accordance with certain embodiments.

As shown in the view 400 of FIG. 4, suppose that the electronic circuitry 200 (FIG. 2) receives incoming data for write caching in SSD storage having a 4K native page size (e.g., also see the write cache 310 in FIG. 3). For example, an application may require 8 GB to be write cached of which 4 GB is user data and 4 GB is corresponding metadata.

As shown in FIG. 4, the incoming data 410 requires an 8 GB footprint. Along these lines, the user data is provided in 4 KB pages (1 M pages initially consuming 4 GB). Additionally, the corresponding metadata is provided in 512 B sectors (8 M sectors initially consuming 4 GB).

The electronic circuitry 200 performs inflate operations 410 to inflate all of the 512 B sectors of corresponding metadata to 4 KB pages. Accordingly, the electronic circuitry 200 allocates 32 GB for the 8 M sectors that were inflated resulting in a footprint of 32 GB for the inflated corresponding metadata.

As a result and as shown in FIG. 4, the inflated data derived from the incoming data 410 requires an inflated 36 GB footprint. Within the 36 GB footprint, 8 GB is for user data and 32 GB is for the corresponding metadata.

It should be appreciated that the context of FIG. 4 is a write cache for storage equipment which may be provisioned with storage drives having capacities in terabytes (e.g., 4 TB, 8 TB, 16 TB, etc.). Accordingly, the 36 GB footprint for the inflated data 430 is acceptable (e.g., extremely small compared to the available SSD capacity) and enables write caching with low latency (e.g., less than 200K IOPS).

It should be further appreciated that there may be instances in which the electronic circuitry 200 does not inflate incoming data. For example, for very large incoming data, inflating may result in hitting certain bandwidth limits (e.g., saturation of a drive's PCIe link).

To address this and in accordance with certain embodiments, the electronic circuitry 200 initially compares the size of the incoming data to a predefined threshold to determine whether to perform an inflate operation. If the size of the incoming data is less than the predefined threshold, the electronic circuitry 200 inflates the incoming data to align with the native page size boundaries of the write cache and thus provide acknowledgement with low latency. However, if the size of the incoming data is greater than the predefined threshold, the electronic circuitry 200 does not inflate the incoming data thus potentially avoiding bandwidth saturation.

FIG. 5 shows a view 500 regarding certain details for the electronic circuitry 200 in accordance with certain embodiments. In particular, the view 500 includes the write cache 310 (SSD storage or similar commodity storage hardware) and a predefined threshold 510. By way of example, the native page size of the write cache is 4 KB and the threshold 510 is 32 KB.

In the view 500, the electronic circuitry 200 processes two example sets of incoming data 520, 522. The first example incoming data 520 is relatively small (e.g., less than 8 KB). However, the second example incoming data 522 is relatively large (e.g., greater than 32 KB).

For the first example incoming data 520, the electronic circuitry 200 performs a threshold compare operation 530 in which the electronic circuitry 200 compares the size of the first example incoming data 520 to the predefined threshold 510. By way of example, the incoming data 520 includes 4 KB of user data and 512 B of corresponding metadata. A result of the threshold compare operation 530 indicates that the size of the first example incoming data 520 is lower than the threshold 510.

In response to the comparison result, the electronic circuitry 200 performs an inflate operation 540 to inflate all 512 B sectors to the native page size of the write cache 310 which is 4 KB. Accordingly, the electronic circuitry 200 generates inflated data 550 from the incoming data 520. As shown in FIG. 5, the inflated data 550 is padded with zeroes and is 8 KB in size.

The electronic circuitry 200 then performs a caching operation 560 which writes the inflated data 550 into the write cache 310. It should be appreciated that this write operation is relatively fast enables the electronic circuitry 200 to provide an acknowledgement in a write-back manner even though the incoming data 520 has not been stored in secondary storage (e.g., see the secondary storage 320 in FIG. 3). Moreover, inflation does not cause saturation of the write cache bandwidth.

For the second example incoming data 522, the electronic circuitry 200 performs a threshold compare operation 570 in which the electronic circuitry 200 compares the size of the second example incoming data 522 to the predefined threshold 510. By way of example, the incoming data 522 includes 32 KB of user data and 512 B of corresponding metadata. A result of the threshold compare operation 570 indicates that the size of the second example incoming data 520 exceeds the threshold 510 of 32 KB.

In response to the comparison result, the electronic circuitry 200 does not perform an inflate operation. Rather, the electronic circuitry 200 leaves the second example incoming data 520 uninflated.

The electronic circuitry 200 then performs a caching operation 580 which writes the second example incoming data 520 into the write cache 310. It should be appreciated that such refraining from inflating the second example incoming data 520 due to the relatively large size prevents saturating write cache bandwidth (e.g., an NVMe PCIe link). Additionally, it should be appreciated that the relatively large size of the second example incoming data 520 is going to result in somewhat higher latency anyways (i.e., such higher latency is expected and thus satisfactory) so not inflating the second example incoming data 520 is an acceptable outcome.

Accordingly, use of the predefined threshold 510 enables selective inflation of incoming data based on incoming data size. Such selective inflation enables low latency when write cache processing incoming data that is small in size (by inflating the data into full pages). Additionally, such selective inflation avoids saturating write cache bandwidth when write cache processing incoming data that is large in size (by refraining from inflating the data).

In some embodiments, the predefined threshold 510 is derived through statistical evaluation. Along these lines, various data storage platforms may be evaluated to determine appropriate threshold values that balance low latency with possible bandwidth saturation.

Additionally, the various predefined thresholds to choose from may depend on the native page size of the memory that forms the write cache 310. For example, if the native page size is 4 KB, suitable thresholds include 16 KB, 32 KB, 64 KB, 128 KB, and so on.

Furthermore, the particular value of the predefined threshold 510 for a particular data storage platform may depend on the configuration of data storage components within the platform. Moreover, such a threshold 510 may be adjusted/tuned over time based on evaluation of further statistics once the platform is deployed in order to accommodate factors such as user/host application behaviors, network traffic, daily usage trends, and so on. Further details will now be provided with reference to FIG. 6.

Figure 6:
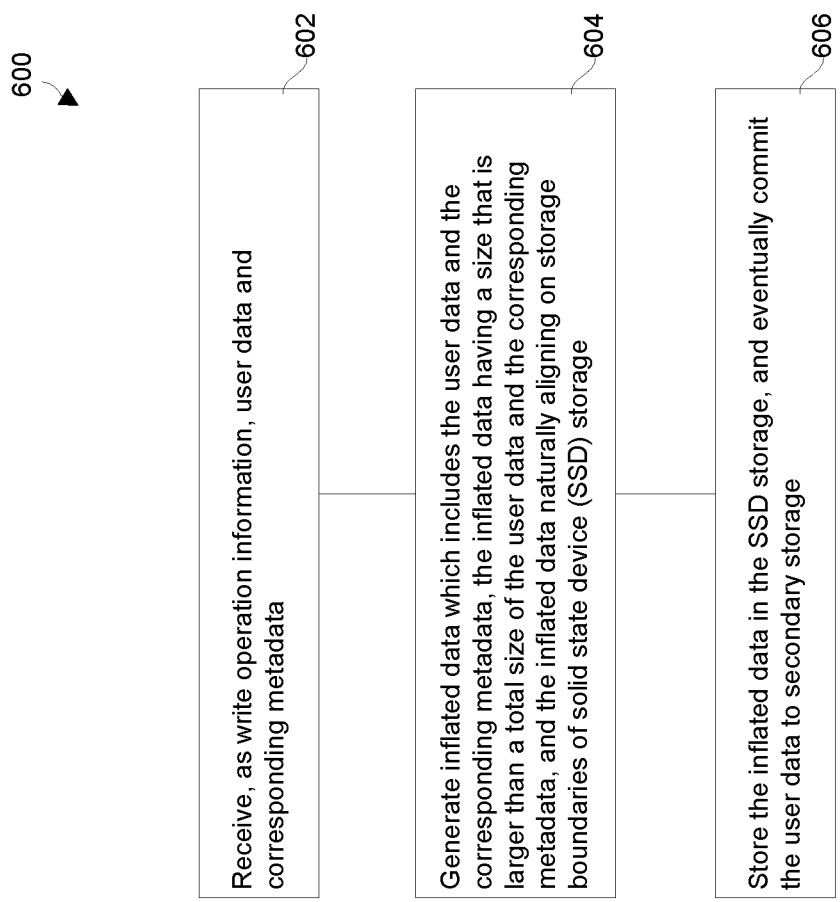
FIG. 6 is a flowchart of a procedure to process write operation information using inflated data in accordance with certain embodiments.

FIG. 6 is a flowchart of a procedure 600 to process write operation information using inflated data in accordance with certain embodiments. Such a procedure 600 is performed by specialized circuitry and is well suited for caching incoming data into commodity hardware such as SSD storage (also see the data storage equipment 104 in FIG. 1 and the electronic circuitry 200 in FIG. 2).

At 602, the specialized circuitry receives, as the write operation information, user data and corresponding metadata. In some arrangements, the specialized circuitry confirms that the size of the write operation information is below a predefined threshold and only generates inflated data if the overall size of the user data and corresponding metadata (i.e., total size) is less than the predefined threshold.

At 604, the specialized circuitry generates inflated data which includes the user data and the corresponding metadata. The inflated data has a size that is larger than a total size of the user data and the corresponding metadata. Additionally, the inflated data naturally aligns on storage boundaries of SSD storage.

At 606, the specialized circuitry stores the inflated data in the SSD storage. At this point, the specialized circuitry may provide acknowledgement back to the source of the write operation information. At some point and as further indicated in 606, the specialized circuitry writes the data to secondary storage (e.g., via late binding).

As described above, improved techniques are directed to processing write operation information using inflated data which naturally aligns on storage boundaries of SSD storage (e.g., commodity hardware that forms a write cache 310). Such techniques enable writing user data and corresponding metadata as full writes which are aligned with the native page size of the SSD storage. Accordingly, such operation alleviates the need to perform read-modify-write (RMW) operations that would otherwise increase latency (e.g., there is no need to read data from the SSD storage, modify the read data to fit in the new data with smaller granularity, and then write the modified data to the SSD storage). Moreover, such operation enables the use of standard SSD storage as a write cache thus removing the need for additional resources such as a battery to persist data, alleviating the need to deal with frequent technology changes in higher performance and higher endurance memory, and lowering costs.

While various embodiments of the present disclosure have been particularly shown and described, it will be understood by those skilled in the art that various changes in form and details may be made therein without departing from the spirit and scope of the present disclosure as defined by the appended claims.

Additionally, it should be understood that various components of the electronic setting 100 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be appreciated that, in the era of competition of all-flash-arrays, one of the characteristics by which an array may be measured is via write latency/response-time. To achieve the best write-operation response-time possible, some arrays may use a low-latency log/journal/write-cache that stores the data and a minimal set of metadata to minimize the time-to-ack. A late bind that properly stores the data within the array's data-structure is then performed at a later phase. The data that is being written to the log/journal/write-cache must be persistent and protected in the sense that it must sustain any reboot or power-outage. Losing this data before is destaged is unacceptable and will be considered a data-loss. The devices used for log/journal/write-cache must provide low-latency and high endurance to sustain the high amount of data-written to them on a daily basis.

NVMe PCIe block devices such as NVRAMs, provide high performance and high endurance which can be leveraged by storage systems as their log/journal/write-cache. However, NVRAMs are currently not common, scarcely sourced and require a relatively large battery. This technology has a limited lifetime and may require integration of new types/vendors every few years, while these integrations are long and tedious and may create permutation of the product line.

Using common SSDs (e.g., commodity hardware) as log/journal/write-cache would be preferable but these pose the challenge of these drives being worn-out ahead of time, and the limited performance and response-time they provide out-of-the-box. Using high endurance SSDs may be too expensive resulting in a non-competitive solution.

Disclosed herein and in accordance with certain embodiments, a mechanism serves as a cost-effective alternative for storage systems which can provide similar behavior using commodity hardware. To achieve that both (a) performance, (b) endurance of such SSDs is considered.

A goal, in accordance with certain embodiments is to use a regular SSD for the log/journal/write-cache without compromising the performance and endurance while maintaining the cost-effectiveness of the solution. Such use enables a storage system persistent-cache using commodity hardware to be achieved.

It should be appreciated that it is common for an SSD to have an indirection unit (IU) of at least 4 KB, while still maintaining an external sector size of 512 B which allows 512 B writes. Accordingly, the storage system may write small sector size (512 B) blocks as well as native 4 k blocks.

In some storage arrays, metadata writes are done at 512 B granularity, while user-data writes are done at 4K page size granularity, while most write operations include both user-data and corresponding metadata. In addition, user-data may also be written in sub-4K IO sizes.

Typically, the SSD 512 B-write-performance (<200 k IOPS) is lower than its 4 KB write performance (900 k IOPS), as drives need to read-modify-write (RMW) a 4K blocks to accomplish a 512 B write. In some cases, the drive will perform a synchronous operation, meaning write latency equals to read+write latency, while in other cases, drive may perform it as async operation, but still significantly limit the overall write IOPS (i.e—75%).

Based on the above, it should be appreciated that 512 B writes may generate a RMW operation that is sub-optimal from the drive's perspective. Along these lines, an extensive amount of 512 B writes may pull the overall performance down due to the drive's mechanism and low performance of 512 B-writes.

As an example, imagine a system that for every 4 KB of data (or several pages), writes 512 B of MD. Since the 512 B IOPS are very limited, the overall write performance of the system will be limited.

In accordance with certain embodiments, the goal is to find a way around using the 512 B IOs, and sticking as much as possible to IU that is optimal for the drive's performance.

So, in these embodiments, the goal is to achieve the best write performance possible, while using a commodity SSD as a device for persistent log/journal/write-cache without compromising the latency, IOPS or bandwidth.

To avoid 512 B writes overhead, the application (log/journal/write-cache) which is using such drives is configured to inflate all 512 B sectors to 4 KB-meaning the application will pad such sectors with 3,584 B of zeros thus achieving a full 4K page write-operation that is aligned with the drive's native-page-size and hence optimal for the drive's performance.

As an example, if the application required 8 GB, out of them 4 GB of 512 B sectors (i.e 8 M sectors)+4 GB of 4 k pages (1 M pages), it will now allocate 36 GB: 32 GB for the 8 M sectors that were inflated to 4 k pages, and an additional 4 GB for the 4 k pages.

Note that given the application in discussion is mostly log/journal/write-cache that initially has a relatively small footprint (tens to hundreds of GB) compared to a drive's capacity (4 TB to 16 TB). Accordingly, inflating the footprint is acceptable.

Doing that solves the problem for low 512 B IOPS (and increased latency)—now incoming data can be written at the rate of the drive's 4 k IOPS. However, the inflation results with two side effects:

a. Endurance: instead of writing 4.5 KB, application now writes 8 KB.

b. Performance: the overall system IOPS is improved, a new limitation may exist in certain drives such as PCIe devices (say 3.2 GB/s for a PCIe Gen5 drives). For such devices, the cost of inflation may take its toll if performed blindly.

For example, say we have a drive that uses a Gen3 PCIe x4 link that can provide ~3.2 GB/s. Then for large system-IOs that can saturate the drive's PCIe link, we were previously writing 8.5 KB (8 KB+512 B), but after inflation we need to write 12 KB (8 KB+4 KB). This means that our previous max BW (to saturate the drive's link) was 3.01 GB/s (3.2 GB/s×8/8.5-6.25% BW overhead), and after inflating it, we are down to 2.1 GB/s (3.2 GB/s×8/12-50% BW overhead).

To mitigate that large BW overhead, some embodiments involve dynamically modifying the write size according to the ingest system IO size. So, for small blocks writes (i.e. 4K/8K/etc.) which requires high IOPS for the MD descriptor, but are not limited by PCIe BW, the circuitry writes a padded descriptor using 4K writes (with a significant link overhead), which will maximize our IOPS.

While for large block writes which require high BW, and are limited by the overhead of the PCIe BW, the circuitry falls back to 512 B sector (still written in 4K allocations), to reduce the link overhead. In this case, the circuitry simply lets the drive do its thing (e.g. RMW), thus paying the toll of IOPS overhead which is not the bounding-factor.

It should be appreciated that, as most endurance in the field is driven by large IOs, refraining from inflating large data will also help reduce the endurance overhead.

In accordance with certain embodiments, small write IOs involve inflating the MD-descriptors and allocate them in 4 k pages (corresponding to the drive native page size). In some situations, the system may be tested to find a threshold of write IO size where below it we write a sector padded to 4K, and above it inflation is disabled/avoided and the data is written as a non-padded 512 B sector to a 4K inflated page (obviously all the pages are zeroed at first).

In some embodiments, the drive's endurance is addressed by using SSDs with healthy capacity (e.g., 4 TB, 8 TB, 16 TB), limiting the size of the write cache (e.g., 4 GB, 8 GB, etc.) and giving back the remaining capacity to the SSD firmware.

Since these drives would serve as log/journal/write-cache that only require few tens up to hundreds of GBs, compared to the drive's capacity of 4 TB to 16 TB, such configuration allows for short-stroking the drive up to 98%-99% that will result in a write amplification factor (WAF) of 1.0+/− (as most writes would become sequential).

SSD used as a caching device are short-stroked to the size of cache (i.e. extra capacity will not be used for any other purposes)

Such operation allows WPD of the SSD to increase (from 1× to ~5×)

Depending on the WPD requirements of the cache, appropriate size of the SSD can be chosen For example, if 32 TB of WPD is needed (Page-Blocks+Page-Descriptors) for cache, then 8 TB SSD (with gives ~5×WPD w/ short-stroking) can be chosen.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of processing write operation information, the method comprising:
receiving, as some of the write operation information, user data and corresponding metadata;
based on a size of the user data being less than a threshold, generating inflated data which includes the user data and the corresponding metadata, the inflated data having a size that is larger than a total size of the user data and the corresponding metadata, and the inflated data naturally aligning on storage boundaries of solid state device (SSD) storage;

after generating the inflated data, storing the inflated data in the SSD storage;

receiving, as additional write operation information, additional user data and additional corresponding metadata; and based on a size of the additional user data being greater than the threshold, refraining from generating additional inflated data which includes the user data and the corresponding metadata, and storing the additional user data and the additional corresponding metadata in the SSD storage.

2. The method of claim 1 wherein the SSD storage forms a write cache of a storage array; and
wherein storing the inflated data in the SSD storage includes:
writing the inflated data into the write cache of the storage array.

3. The method of claim 2 wherein the user data is application data;
wherein the corresponding metadata is constructed and arranged to identify write operation details for storing the application data in non-volatile memory of the storage array, the non-volatile memory being different from the write cache, the corresponding metadata having a size which is smaller than that of the application data; and
wherein generating the inflated data includes:
padding the corresponding metadata to form padded metadata having an inflated size that is larger than the size of the corresponding metadata.

4. The method of claim 3 wherein writing the inflated data into the write cache includes:
writing, as the inflated data, the application data and the padded metadata into the write cache to enable late binding of the application data into the non-volatile memory.

5. The method of claim 4, further comprising:
after the application data and the padded metadata are written into the write cache, performing a late bind operation which commits the application data to the non-volatile memory of the storage array.

6. The method of claim 3, further comprising:
prior to receiving the user data and the corresponding metadata, performing a comparison operation which compares a size of the user data to a threshold and provides a comparison result indicating that the size of the user data is lower than the threshold.

7. The method of claim 6 wherein padding the corresponding metadata includes:
in response to the comparison result indicating that the size of the user data is lower than the threshold, creating a full page which includes the corresponding metadata and zeroes, the full page being aligned with a native page size of the SSD storage.

8. The method of claim 7, further comprising:
performing an additional comparison operation which compares the size of the additional user data to the threshold and provides an additional comparison result indicating that the size of the additional user data is greater than the threshold.

9. The method of claim 3, further comprising:
prior to receiving the user data and the corresponding metadata, forming the write cache from a set of SSDs.

10. The method of claim 9 wherein the set of SSDs provides X amount of storage, X amount being at least 1 Terabyte; and
wherein forming the write cache from the set of SSDs includes:
allocating 10% of the X amount of storage to the write cache, and
allocating at least 80% of the X amount of storage to a garbage collection service to minimize write amplification resulting from garbage collecting the write cache.

11. The method of claim 1 wherein the SSD storage includes a set of SSDs which forms a write cache and secondary storage;
wherein storing the inflated data in the SSD storage includes:
writing the inflated data which includes the user data and the corresponding metadata into the write cache; and
wherein the method further comprises:
after writing the inflated data into the write cache, performing a commit operation which synchronizes the user data into the secondary storage.

12. The method of claim 11 wherein performing the commit operation includes:
saving the user data in the secondary storage based on the corresponding metadata.

13. Storage equipment, comprising:
solid state device (SSD) storage; and
control circuitry coupled with the SSD storage, the control circuitry being constructed and arranged to perform a method of:
receiving, as write operation information, user data and corresponding metadata,
based on a size of the user data being less than a threshold, generating inflated data which includes the user data and the corresponding metadata, the inflated data having a size that is larger than a total size of the user data and the corresponding metadata, and the inflated data naturally aligning on storage boundaries of the SSD storage,
after generating the inflated data, storing the inflated data in the SSD storage;
receiving, as additional write operation information, additional user data and additional corresponding metadata; and
based on a size of the additional user data being greater than the threshold, refraining from generating additional inflated data which includes the user data and the corresponding metadata, and storing the additional user data and the additional corresponding metadata in the SSD storage.

14. Storage equipment as in claim 13 wherein the SSD storage forms a write cache; and
wherein storing the inflated data in the SSD storage includes:
writing the inflated data into the write cache.

15. Storage equipment as in claim 14, further comprising:
non-volatile memory coupled with the control circuitry;
wherein the user data is application data;
wherein the corresponding metadata is constructed and arranged to identify write operation details for storing the application data in the non-volatile memory, the corresponding metadata having a size which is smaller than that of the application data; and
wherein generating the inflated data includes:

padding the corresponding metadata to form padded metadata having an inflated size that is larger than the size of the corresponding metadata.

16. Storage equipment as in claim 13 wherein the SSD storage includes a set of SSDs which forms a write cache and secondary storage;
   wherein storing the inflated data in the SSD storage includes:
      writing the inflated data which includes the user data and the corresponding metadata into the write cache; and
   wherein the method further comprises:
      after writing the inflated data into the write cache, performing a commit operation which synchronizes the user data into the secondary storage.

17. A computer program product having a non-transitory computer readable medium which stores a set of instructions to process write operation information; the set of instructions, when carried out by computerized circuitry, causing the computerized circuitry to perform a method of:
   receiving, as some of the write operation information, user data and corresponding metadata;
   based on a size of the user data being less than a threshold, generating inflated data which includes the user data and the corresponding metadata, the inflated data having a size that is larger than a total size of the user data and the corresponding metadata, and the inflated data naturally aligning on storage boundaries of solid state device (SSD) storage;
   after generating the inflated data, storing the inflated data in the SSD storage;
   receiving, as additional write operation information, additional user data and additional corresponding metadata; and
   based on a size of the additional user data being greater than the threshold, refraining from generating additional inflated data which includes the user data and the corresponding metadata, and storing the additional user data and the additional corresponding metadata in the SSD storage.

18. The computer program product of claim 17 wherein the SSD storage forms a write cache of a storage array; and
   wherein storing the inflated data in the SSD storage includes:
      writing the inflated data into the write cache of the storage array.

19. The computer program product of claim 18 wherein the user data is application data;
   wherein the corresponding metadata is constructed and arranged to identify write operation details for storing the application data in non-volatile memory of the storage array, the non-volatile memory being different from the write cache, the corresponding metadata having a size which is smaller than that of the application data; and
   wherein generating the inflated data includes:
      padding the corresponding metadata to form padded metadata having an inflated size that is larger than the size of the corresponding metadata.

20. The computer program product of claim 17 wherein the SSD storage includes a set of SSDs which forms a write cache and secondary storage;
   wherein storing the inflated data in the SSD storage includes:
      writing the inflated data which includes the user data and the corresponding metadata into the write cache; and
   wherein the method further comprises:
      after writing the inflated data into the write cache, performing a commit operation which synchronizes the user data into the secondary storage.

* * * * *